United States Patent
Kim et al.

(10) Patent No.: US 9,317,303 B2
(45) Date of Patent: Apr. 19, 2016

(54) SYSTEM, DEVICE AND METHOD FOR MANAGING INTERACTIVE CONTENT ON A COMPUTING DEVICE

(75) Inventors: Sang-Heun Kim, Mississauga (CA); Charles Laurence Stinson, Mississauga (CA); Christopher Smith, Mississauga (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1152 days.

(21) Appl. No.: 12/413,761

(22) Filed: Mar. 30, 2009

(65) Prior Publication Data
US 2010/0145973 A1    Jun. 10, 2010

Related U.S. Application Data

(60) Provisional application No. 61/120,983, filed on Dec. 9, 2008.

(51) Int. Cl.
| | |
|---|---|
| *G06F 17/30* | (2006.01) |
| *G06F 9/44* | (2006.01) |
| *G06F 17/21* | (2006.01) |
| *H04M 7/00* | (2006.01) |
| *H04L 29/08* | (2006.01) |

(52) U.S. Cl.
CPC ............ *G06F 9/4443* (2013.01); *G06F 17/218* (2013.01); *G06F 17/30905* (2013.01); *H04L 67/02* (2013.01); *H04M 7/003* (2013.01)

(58) Field of Classification Search
USPC ................. 707/10, 759, 733, 760, E17.005, 707/E17.044, E17.107; 715/733, 760
See application file for complete search history.

(56) References Cited

U.S. PATENT DOCUMENTS

| | | | |
|---|---|---|---|
| 5,908,467 A | 6/1999 | Barrett | |
| 6,628,767 B1 * | 9/2003 | Wellner et al. | 379/202.01 |
| 7,660,728 B2 * | 2/2010 | Halavais | G06Q 10/02 |
| | | | 705/5 |
| 2004/0122951 A1 | 6/2004 | Beck | |
| 2005/0097189 A1 * | 5/2005 | Kashi | 709/217 |
| 2006/0069745 A1 | 3/2006 | Boyles | |
| 2007/0256003 A1 | 11/2007 | Wagoner et al. | |

FOREIGN PATENT DOCUMENTS

| | | |
|---|---|---|
| WO | 2005/004444 A2 | 1/2005 |
| WO | 2005004444 A2 | 1/2005 |

OTHER PUBLICATIONS

HTTP Pocket Reference—Wong, Clinton (ISBN 1-565-92862-8), p. 6 and p. 58.*

(Continued)

*Primary Examiner* — Miranda Huang
(74) *Attorney, Agent, or Firm* — Perry + Currier, Inc.

(57) ABSTRACT

A system, device and method for managing interactive content on a computing device are provided. In an embodiment, a computing device in the form of a portable computing device is configured to execute a web-browser application and a parser application. The web-browser application is configured to obtain and display a web page. The parser application is configured to detect an interactive element in the web page, the interactive element initiating execution of an application when activated. The parser application is further configured to populate the web page with a visual identifier indicating the application initiated by activation of the interactive element.

10 Claims, 10 Drawing Sheets

(56) References Cited

OTHER PUBLICATIONS

"Custom CSS Cursors" http://www.javascriptkit.com/dhtmltutors/csscursors.shtml, 3 pages, first published Feb. 7, 2005, retrieved from internet archive wayback machine.*

Wong C: "HTTP Pocket Reference" May 2000, O'Reilly, XP002594729; ISBN: 1-56592-862-8 * p. 6, list item 9 * * p. 59, lines 20-25 and 31-34 * *Table 2 at pp. 60-68 *.

European Patent Application No. 09178566.7 Search Report dated Aug. 13, 2010.

European Patent Application No. EP 09 17 8566 Search Report dated Mar. 24, 2010.

GoogleTube:Firefox Add-ons downloaded from: https://addons.mozilla.org/en-US/firefox/addon/8049.

Skyp Extension for Firefox downloaded from: http://www.skype.com/help/guides/ff_extension/.

GooglePreview: Firefox Add-ons downloaded from: https://addons.mozilla.org/en-US/firefox/addon/189.

Add an Icon or Text next to hyperlinks similar to the globe icon on external hyperlinks downloaded from: http://plone.org/documentation/how-to/addiconsortextwithlinks.

* cited by examiner ered to receive a web page for display by the first-web browser application from a server via the interface. The web page includes at least one interactive element for initiating execution of a second application associated with the at least one interactive element. The processor is further configured to assess the web page to detect the at least one interactive element. The processor is further configured to populate the web page with at least one visual identifier for identifying the application associated with the interactive element. The portable computing device also comprises a display connected to the processor. The processor is further configured to generate the web page with the at least one visual identifier on the display.

SYSTEM, DEVICE AND METHOD FOR MANAGING INTERACTIVE CONTENT ON A COMPUTING DEVICE

CROSS REFERENCE TO RELATED APPLICATION

This application is entitled to the benefit of priority from U.S. Provisional Application Ser. No. 61/120,983 filed Dec. 9, 2008, the contents of which are incorporated herein by reference.

FIELD

The present disclosure relates generally to communication technologies and more particularly to a system, device and method for managing interactive content on a computing device.

BACKGROUND

Input on web pages may be captured by links, form elements, or javascript events. Plugin applications and other applications may initiate based on such input and based on the web pages' protocol specification, file extension, header content type, and so on. It may, however, not be evident that certain inputs to a web page will initiate applications, until the applications have already initiated. The Skype application searches for telephone numbers in a generated web page and regenerates the web page with a link or icon which may initiate the Skype application in order to make a call.

DETAILED DESCRIPTION OF THE EMBODIMENTS

Figure 1:
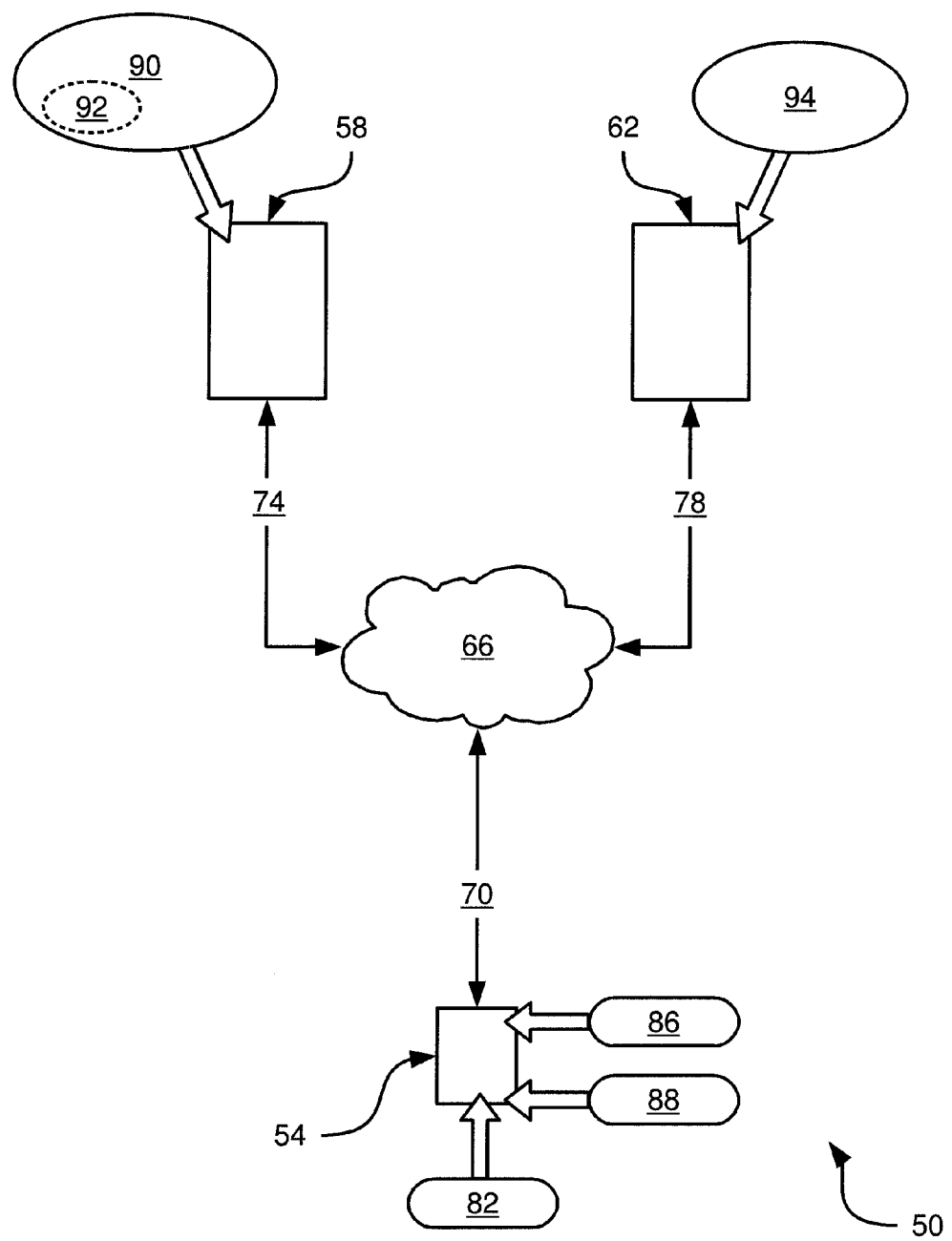
FIG. 1 shows a schematic representation of a system for managing interactive content on a computing device.

An aspect of the specification provides a portable computing device comprising a storage device configured to maintain a first web-browser application. The portable computing device also comprises at least one processor connected to the storage and configured to execute the first web-browser application. The portable computing device also comprises an interface connected to the processor. The processor is config- Another aspect of the specification provides a system for managing interactive content comprising a server configured to maintain a web page executable by a first web-browser application. The web page includes at least one interactive element for initiating execution of a second application associated with the at least one interactive element. The server has an interface to connect the server to a network. The system also comprises a portable computing device having a storage device configured to maintain a first web-browser application. The portable computing device has at least one processor connected to the storage and is configured to execute the first web-browser application. The portable computing device has an interface for interconnecting the processor and the network. The processor is configured to receive the web page for display by the first-web browser application from the server via the interface. The processor is configured to assess the web page to detect the at least one interactive element. The processor is further configured to populate the web page with at least one visual identifier for identifying the application associated with the interactive element. The portable computing device further comprises a display connected to the processor. The processor is further configured to generate the web page with the at least one visual identifier on the display.

Another aspect of the specification provides a method of managing interactive content on a portable computing device, the method comprising: receiving a web page for display by a first web-browser application from a server, the web page including at least one interactive element for initiating execution of a second application associated with the at least one interactive element; assessing the web page to detect the at least one interactive element; populating the web page with at least one visual identifier for identifying the application associated with the interactive element; and generating the web page with the at least one visual identifier on a display of the computing device.

Another aspect of the specification provides a computer readable storage medium configured to maintain a plurality of programming instructions for a processor of a portable computing device. The processor is configured to execute the programming instructions. The programming instructions comprise the method of: receiving a web page for display by a first web-browser application from a server, the web page including at least one interactive element for initiating execution of a second application associated with the at least one interactive element; assessing the web page to detect the at least one interactive element; populating the web page with at least one visual identifier for identifying the application associated with the interactive element; and generating the web page with the at least one visual identifier on a display of the computing device.

Referring to FIG. 1, a system for managing interactive content on a computing device is indicated generally at 50. In a present embodiment system 50 comprises a first computing device in the form of a client machine 54. System 50 also comprises a second computing device in the form of a web server 58. System 50 may comprise additional computing devices, such as an additional web server 62. A network 66 interconnects each of the foregoing components. A first link 70 interconnects client machine 54 and network 66. A second link 74 interconnects web server 58 and network 66. A third link 78 interconnects web server 62 and network 66.

Web server 58 and web server 62 may be based on any known server environment including a module that houses one or more central processing units, volatile memory (e.g. Random Access Memory ("RAM")), persistent memory (e.g. hard disk devices) and network interfaces to allow web servers 58 and 62 to communicate over network 66.

It will be understood that the nature of network 66 and links 70, 74 and 78 associated therewith is not particularly limited. Network 66 and links 70, 74 and 78 are, in general, based on any combination of architectures that will support interactions between client machine 54 and web servers 58 and 62. In the present embodiment network 66 includes the Internet as well as appropriate gateways and backhauls to links 70, 74, 78. Accordingly, links 70, 74, 78 between network 66, client machine 54 and web servers 58 and 62 are complementary to the functional requirements of those components.

More specifically, link 70 between client machine 54 and network 66 may be based in a present embodiment on core mobile network infrastructure (e.g. Global System for Mobile communications ("GSM"); Code Division Multiple Access ("CDMA"); CDMA 2000; 3G; 4G; Evolution-Data Optimized ("EV-DO"), Universal Mobile Telecommunications System ("UMTS"), High Speed Packet Access ("HSPA")). Link 70 may also be based on wireless local area network ("WLAN") infrastructures such as the Institute for Electrical and Electronic Engineers ("IEEE") 802.11 Standard (and its variants), Bluetooth or the like, or hybrids thereof. Note that in an exemplary variation of system 50 it is contemplated that client machine 54 may be other types of client machines whereby link 70 is a wired connection.

Link 74 may, for example, be based on a T1, T3, O3 or any other suitable wired or wireless connection between server web 58 and network 66. Link 78 may, for example, be based on a T1, T3, O3 or any other suitable wired or wireless connection between web server 62 and network 66.

Figure 2:
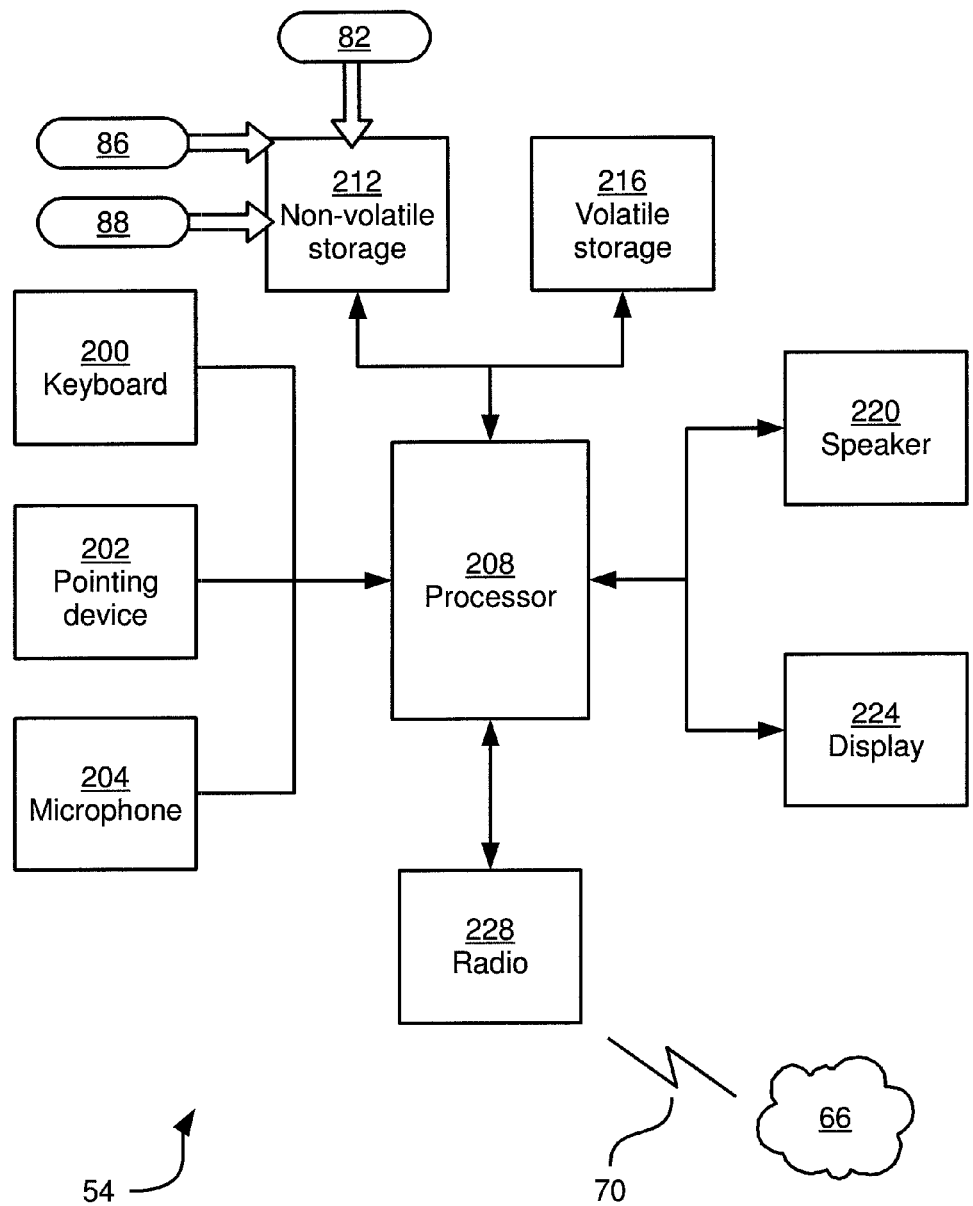
FIG. 2 shows a schematic representation of the client machine computing device in FIG. 1.

Referring to FIG. 2, a schematic block diagram shows client machine 54 in greater detail. It will be understood that the structure in FIG. 2 is purely exemplary, and contemplates a device that may be used for both wireless voice (e.g. telephony) and wireless data (e.g. email, web browsing, text) communications. (Note that various functionalities such as voice functionality, email functionality and other functionality may be optional, according to the context of various applications that can be invoked by method 400, described below). Client machine 54 includes a plurality of input devices. In a present embodiment, the input devices include a keyboard 200, a pointing device 202 (e.g. a trackwheel, a trackball, or a touch screen) and a microphone 204. Other input devices, such as a camera lens and associated image sensor (not shown) may optionally be included. Input from keyboard 200, pointing device 202 and microphone 204 may be received at a processor 208, which in turn communicates with a non-volatile storage unit 212 (e.g. read only memory ("ROM"), Electrically Eraseable Programmable Read Only Memory ("EEPROM"), Flash Memory) and a volatile storage unit 216 (e.g. random access memory ("RAM")). It will now be understood by those skilled in the art that non-volatile storage unit 212 and volatile storage unit 216 are non-limiting examples of computer readable storage media. Other examples of computer readable storage media include a removable storage card that can be received in a removable storage card reader (not shown) that is incorporated into client machine 54.

Programming instructions that implement the functional teachings of client machine 54 as described herein are typically maintained, persistently, in non-volatile storage unit 212 and used by processor 208 which makes appropriate utilization of volatile storage unit 216 during the execution of such programming instructions. Of particular note is that non-volatile storage unit 212 persistently maintains a web-browser application 82 and a parser application 86, each of which can be executed on processor 208 making use of volatile storage unit 216 as appropriate. Various other applications, such as a document viewer application 88, are maintained in non-volatile storage unit 212 according to the desired configuration and functioning of client machine 54. Examples of other applications (not shown) which may be maintained in non-volatile storage unit 212 include voice call and multimedia player applications. Further examples of other applications (not shown) which may be maintained in non-volatile storage unit 212 include calendar, address book and email applications.

Web-browser application 82 may be configured to provide web-browser functionality on client machine 54, by rendering web pages on display 224 of client machine 54. Web-browser application 82 thus provides HTML and other web-browsing capability, such as Java script. In general, client machine 54 may be configured to interact, via a radio 228, with content available over network 66, including web content on web servers 58 and 62 via web-browser application 82.

Figure 3:
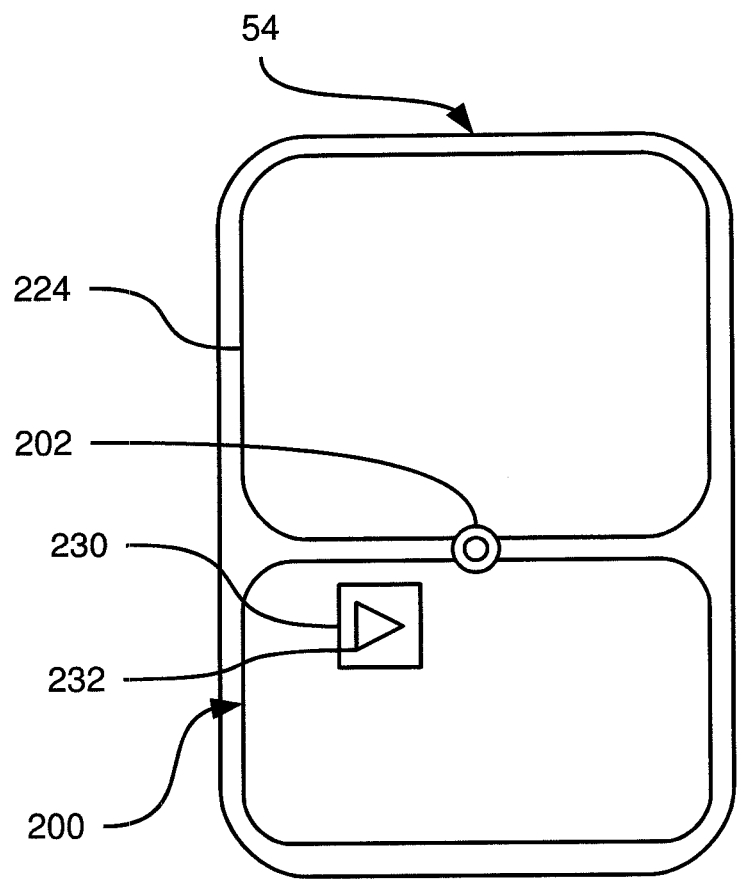
FIG. 3 shows a partial front elevational view of the client machine computing device in FIG. 1.

Referring now to FIG. 3, client machine 54 is depicted, showing an arrangement of display 224, pointing device 202 and keyboard 200 according to some embodiments. It will be noted that keyboard 200 may comprise at least one launcher button 230. Launcher button 230 may be configured to initiate the execution of an application maintained in non-volatile storage unit 212, and the application which is initiated by launcher button 230 may be indicated by way of an icon or other visual identifier on launcher button 230. In the present embodiment, launcher button 230 comprises an icon 232. Icon 232 may comprise, for example, a logo, symbol, color, or other visual identifier. In one example, icon 232 may indicate that launcher button 230 initiates execution of document viewer application 88 on client machine 54. The implementation of launcher button 230 is not particularly limited. For example, launcher button 230 may be configured to initiate execution of a variety of applications.

Returning again to FIG. 1, web server 58 and web server 62 are configured to host respective web pages 90 and 94. In a present embodiment, web page 90 hosted by web server 58 includes programming instructions representing at least one interactive element 92, as will be described below in greater detail.

Figure 4:
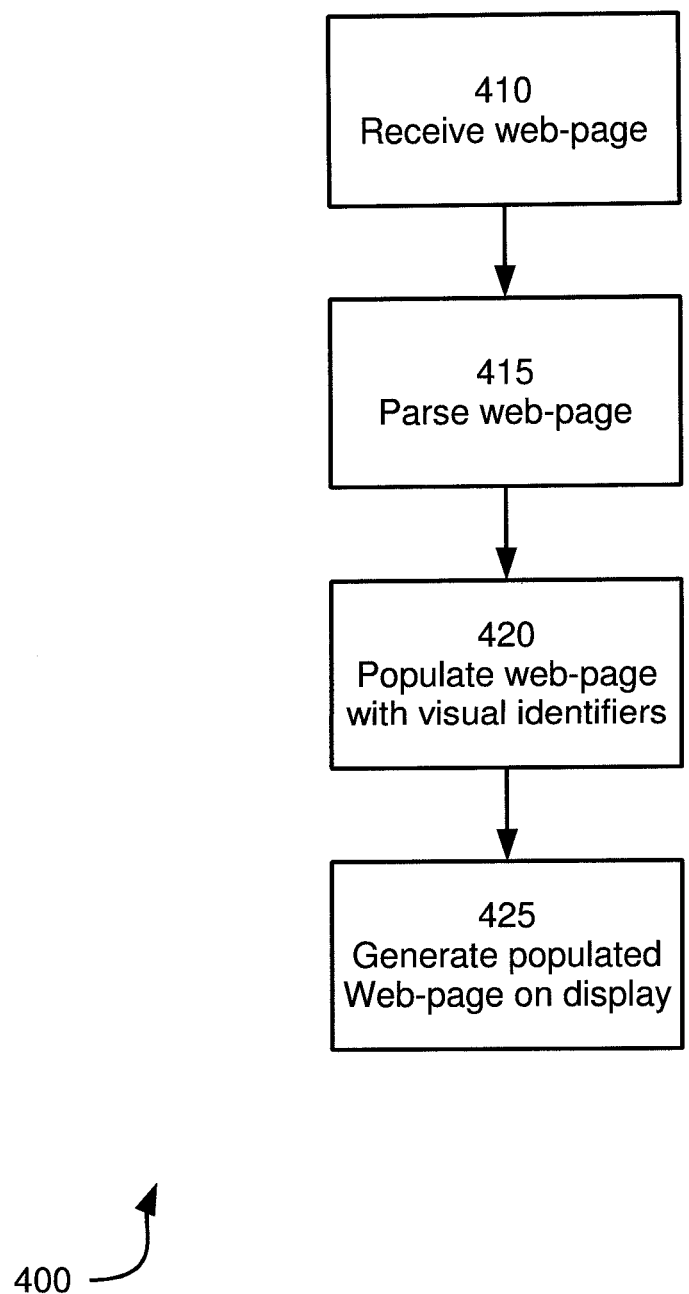
FIG. 4 shows a flow-chart depicting a method of managing interactive content.

Referring now to FIG. 4, a flow-chart is provided depicting a method, indicated generally at 400, for managing interactive content on a computing device. Method 400 will be described in conjunction with its exemplary performance on system 50, but it will be understood that system 50 and method 400 may both be varied within the scope of the present teachings. For example, the method 400 need not be performed in the exact sequence as presented in FIG. 4.

Block 410 comprises receiving a web page. In system 50, block 410 is performed by client machine 54, which accesses web page 90 via network 66 in the usual manner. In a present embodiment, web-browser application 82 retrieves web page 90 via network 66 from web server 58 in the usual manner.

Figure 5:
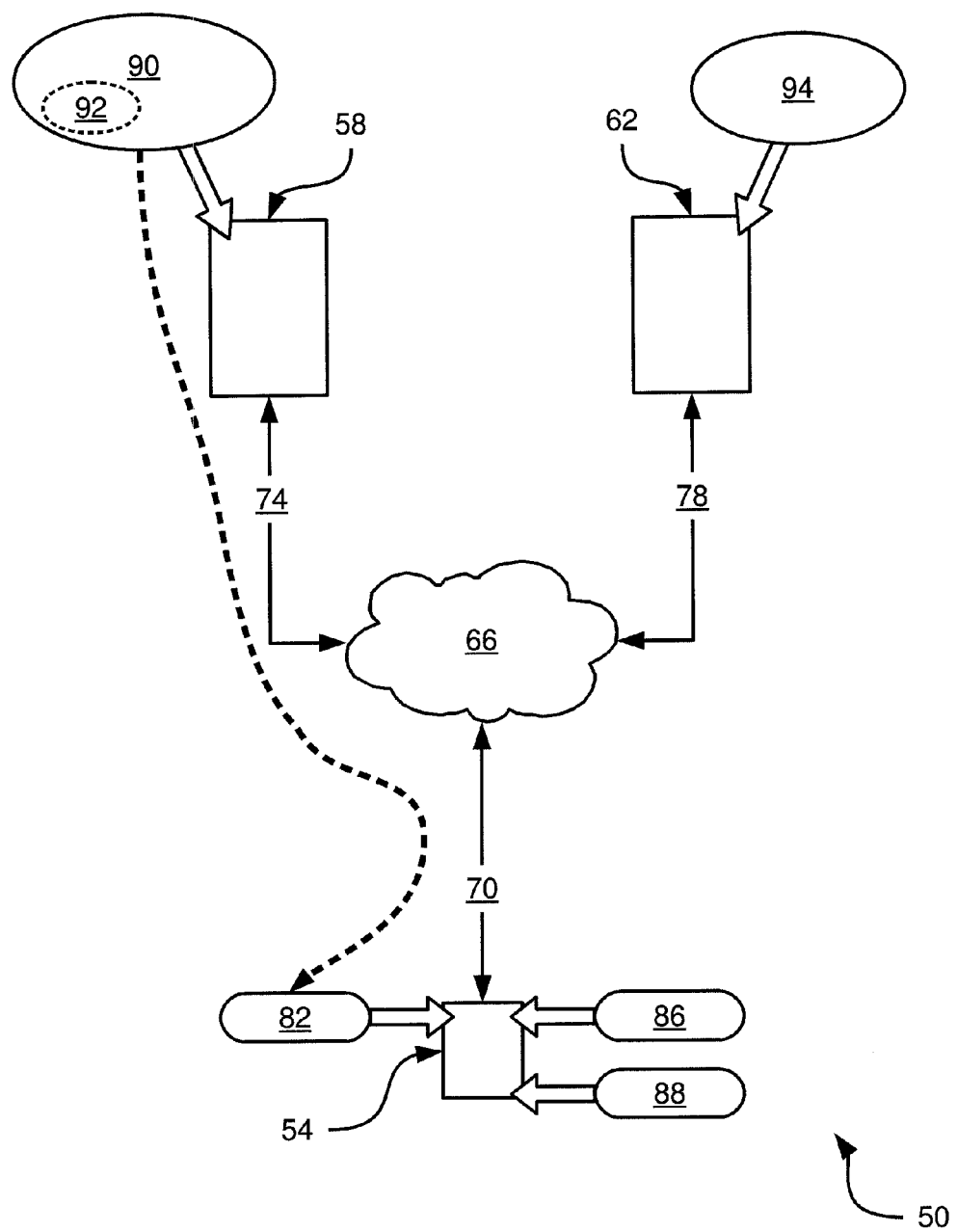
FIG. 5 shows exemplary performance of block 410 on the system of FIG. 1.

Block 410 is represented in FIG. 5 as web page 90 is shown being downloaded to client machine 54 from web server 58 using web-browser application 82. Note that interactive element 92 is also retrieved as part of this process.

Figure 6:
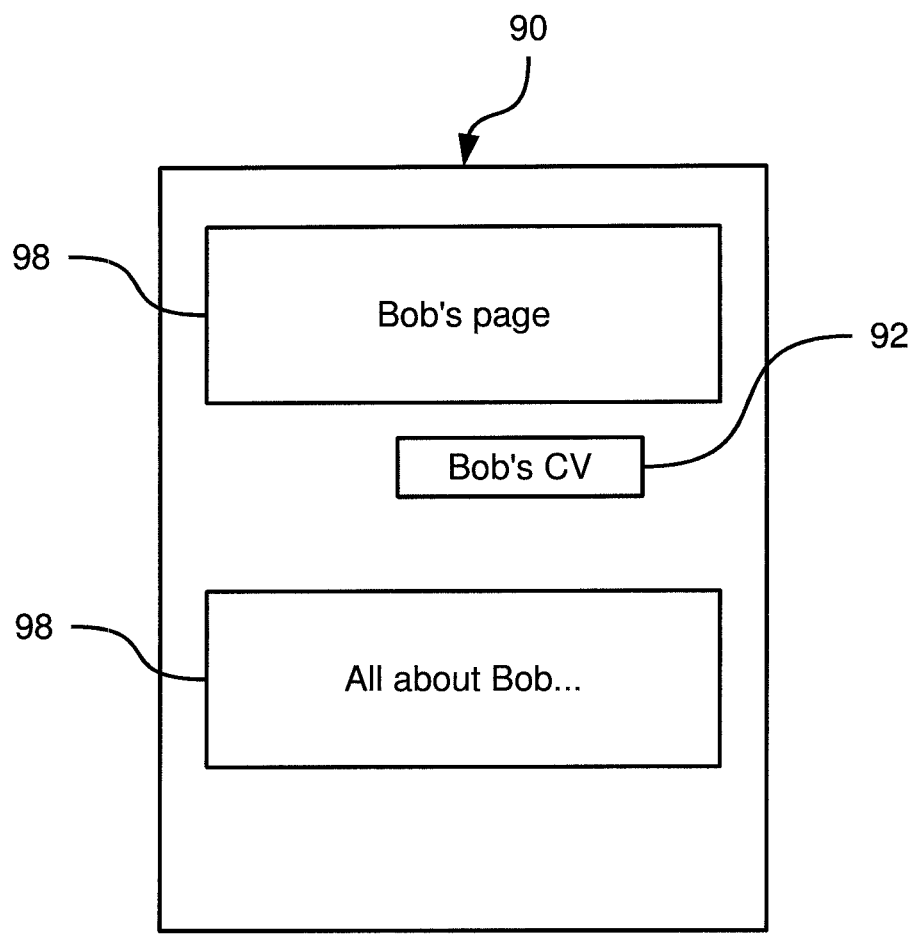
FIG. 6 shows an example of a web page obtained during exemplary performance of block 410.

Block 415 comprises parsing web page 90. As illustrated in FIG. 6, web page 90 may comprise text indicated at blocks 98. For example, blocks 98 may include a title block such as "Bob's page" in FIG. 6, and a body text block such as "All about Bob . . . " in FIG. 6. Web page 90 may also comprise interactive element 92. Interactive element 92 may, for example, comprise an http link. Interactive element 92 may alternatively comprise a fillable form element. In general, it will be appreciated that interactive element 92 may be varied, and that many interactive elements of varying natures may be present on web page 90. In a present embodiment, interactive element 92 comprises an http link to a document such as a Portable Document Format ("PDF") document. It will be understood that activation of interactive element 92 on web page 90 results in initiation of an application such as a web-browser plugin for viewing the linked PDF document. On client machine 54 in a present embodiment, activation of interactive element 92 initiates execution of document viewer application 88.

Figure 7:
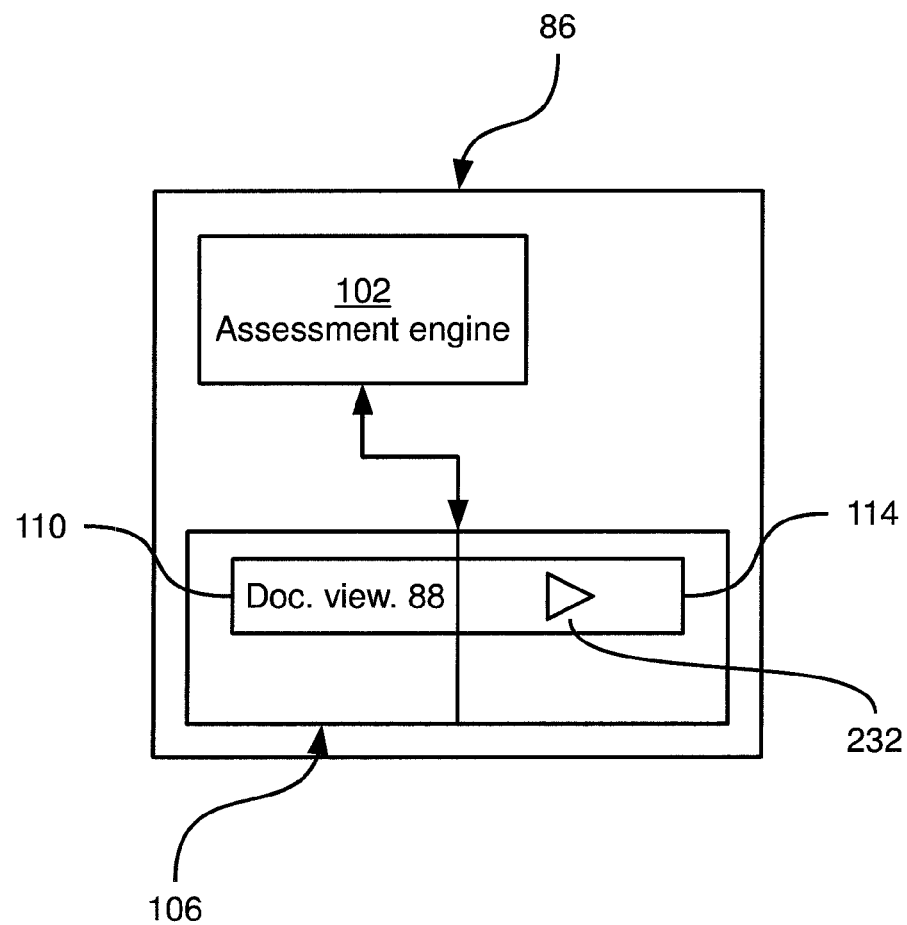
FIG. 7 shows a schematic view of a parser application of the client machine computing device in FIG. 1.

Returning to FIG. 4, block 415 in a present embodiment is performed by parser application 86 on client machine 54. Parser application 86 may be a stand-alone application, or may be partially integrated with web-browser 82. Parser application 86 may also be fully integrated as a component of web-browser 82. Parser application is illustrated in the schematic block diagram of FIG. 7. Parser application 86 comprises an assessment engine 102 and a visual identifier database 106. Visual identifier database 106 may be represented in the form of a table having one or more application fields and corresponding visual identifier fields. In a present embodiment, visual identifier database 106 comprises an application field 110 containing an indication of document viewer application 88. Visual identifier database 106 also comprises a visual identifier field 114 corresponding to application field 110. Visual identifier field contains a visual identifier for the application indicated in application field 110. As depicted in FIG. 7, visual identifier field 114 contains a visual identifier for document viewer application 88 in the form of an icon similar to icon 232 depicted in FIG. 3. It will be appreciated that additional fields 110 and 114 may be provided for additional applications.

In performing block 415, assessment engine 102 of parser application 86 assesses web page 90 to detect interactive element 92. Interactive element 92 may be detected in a variety of ways. In general, assessment engine 102 may detect interactive element 92 by assessing any combination of the protocol specification, file extensions and header content types present in web page 90. In the present embodiment, web page 90 is an HTML-based web page, and interactive element 92 comprises a link which may be detected by searching the source of web page 90 for a flag such as "href." Assessment engine 102 may also, to the extent that it is possible, determine the nature of the application to be initiated by interactive element 92. For example, if the link comprised within interactive element 92 includes the expression ".pdf" assessment engine 102 may determine that activation of interactive element 92 initiates execution of document viewer application 88 for viewing a PDF document. It will be understood, however, that the above search is purely exemplary and that many alternative searches are contemplated herein.

Returning to FIG. 4, method 400 then advances to block 420. At block 420, web page 90 is populated with visual identifiers for detected interactive elements. It will be understood that in the present embodiment, a copy of web page 90 local to client machine 54 (obtained from web server 58 as shown in FIG. 5) is populated rather than web page 90 as hosted at web server 58. As described earlier, interactive element 92 in a present embodiment initiates document viewer application 88 on client machine 54. This may not, however, be apparent from the superficial nature of interactive element 92. As depicted in FIG. 6, interactive element 92 comprises text that is displayed as part of web page 90 reading "Bob's CV" and does not provide any indication that execution of an application will be initiated upon activating "Bob's CV." Client machine 54, which in a present embodiment is a portable wireless device, has relatively limited computational and memory resources and may not be capable of bringing a substantial portion of those resources to bear on the execution of document viewer application 88 following activation of interactive element 92 without compromising performance in other areas. The provision of a visual identifier to indicate that interactive element 92 initiates execution of document viewer application 88 therefore aids in the effective management of the resources of client machine 54.

Referring again to FIG. 7, block 420 is carried out by parser application 86. Assessment engine 102 of parser application 86 may query visual identifier database 106 with an indication of the detected application initiated by interactive element 92. In the present embodiment, assessment engine 102 queries visual identifier database 106 with an indication of document viewer application 88. Visual identifier database 106 contains a matching indication in field 110, and returns to assessment engine 102 the visual identifier contained within field 114 corresponding to field 110. In the present embodiment, therefore, icon 232 is returned to assessment engine 102. As part of the performance of block 420, assessment engine 102 is configured to insert the returned visual identifier into the copy of web page 90 local to client machine 54.

Figure 8:
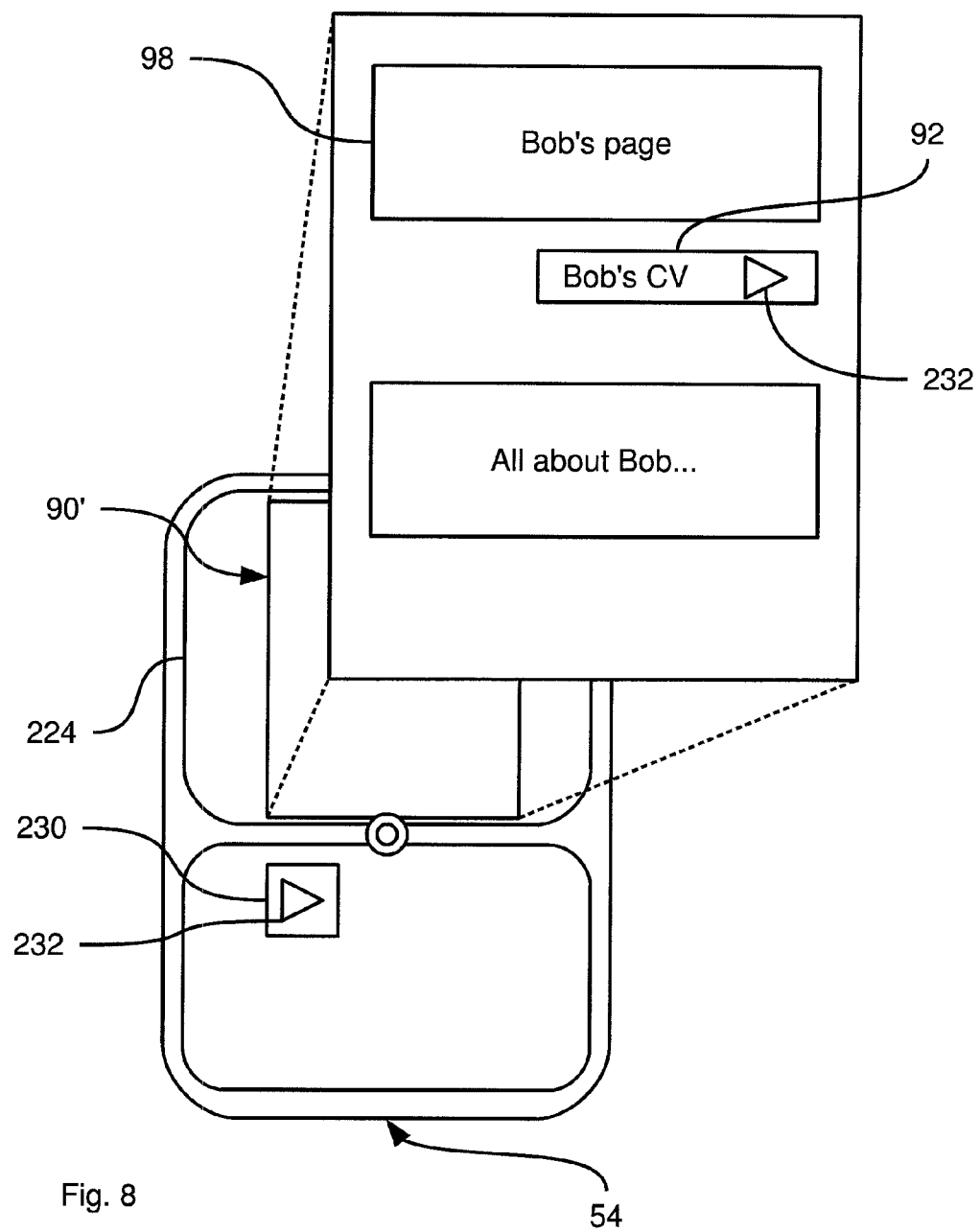
FIG. 8 shows a partial front elevational view of the client machine computing device in FIG. 1 displaying an example of the web page of FIG. 6 after population by the parser application of FIG. 7.

Returning again to FIG. 4, method 400 then advances to block 425. At block 425 web page 90 is generated on display 224 of client machine 54. It will be understood that the terms "generate" and "render" as used herein are equivalent. The performance of block 425 is illustrated in FIG. 8. As depicted in FIG. 8, web page 90 has been modified and is generated on display 224 as web page 90'. Web page 90 may be modified by assessment engine 102 such that interactive element 92 now comprises text reading "Bob's CV" as well as icon 232 indicating that execution of document viewer application 88 on client machine 54 is initiated upon activation of interactive element 92. It will be understood that assessment engine 102 may achieve this result at block 420 of method 400 by, for example, editing interactive element 92 within the source of web page 90. In other embodiments (not shown), assessment engine 102 may instead populate web page 90 with icon 232 or other visual identifiers such that icon 232 is not comprised within interactive element 92, but is instead located proximal to interactive element 92 when web page 90' is generated on display 224.

Note that icon 232 appears on both launcher button 230 and web page 90'. In this manner web page 90' remains consistent with the conventions of client machine 54. It will be understood, however, that it is not necessary to use similar icons to denote similar applications, and web page 90' may use a different visual identifier to indicate document viewer application 88. For example, client machine 54 may have a plurality of themes comprising different selectable sets of visual identifiers for the various applications stored in non-volatile storage unit 212. The visual identifier contained within cell 114 of visual identifier database 106 may be updated based on the selected theme for client machine 54, in which case the visual identifier with which assessment engine 102 populates web page 90' may not correspond to icon 232.

It will now be appreciated that the performance of method 400 may eliminate the need for designers of web pages 90, 94 to provide visual identifiers (which may be bandwidth-hungry images representing icons) indicating applications initiated by interactive elements. This in turn reduces the overall volume of information within, for example, web page 90 at web server 58. Thus, the bandwidth consumed by client machine 54 in downloading web page 90 as shown in FIG. 5 is reduced as such visual identifiers are instead provided locally to client machine 54. It will also be appreciated that computational and memory resources of client machine 54 may be more effectively utilized, as initiation of an application such as document viewer application 88 may more easily be avoided when such initiation is not desirable.

Figure 9:
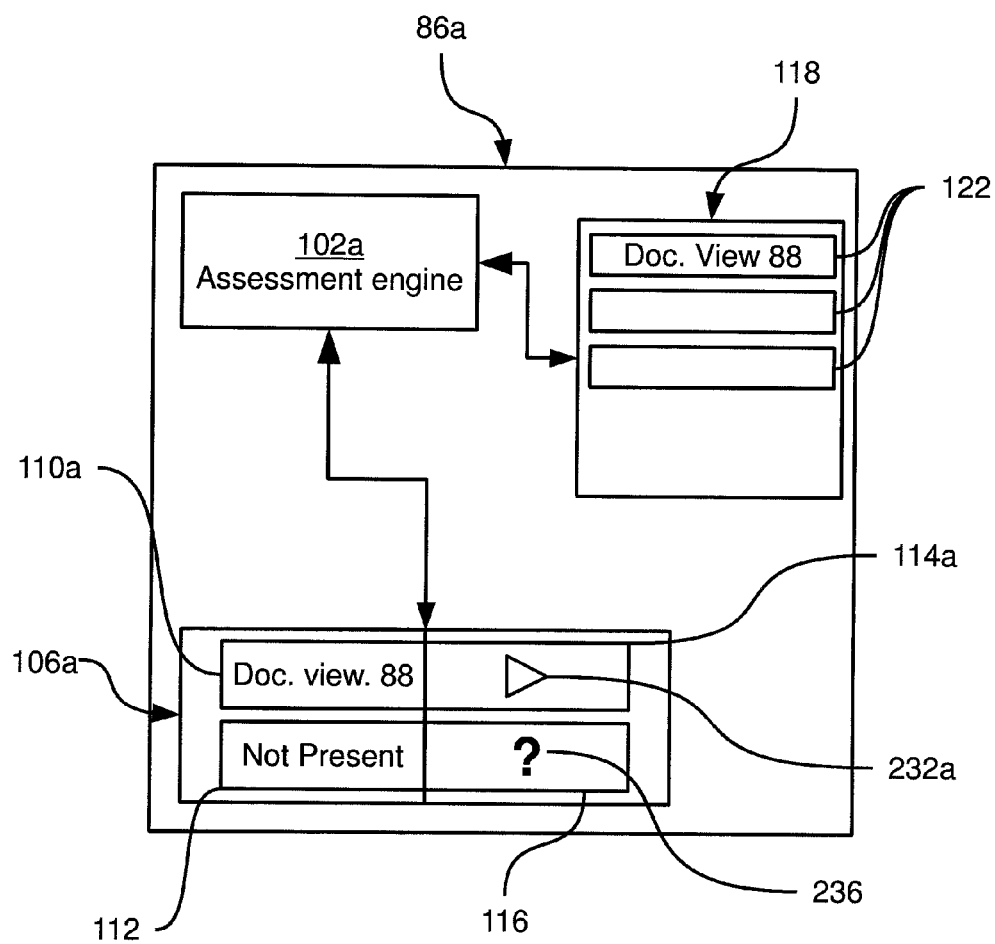
FIG. 9 shows a schematic view of a further embodiment of a parser application.

An alternative embodiment of parser application 86 will now be described with reference to FIG. 9, in which like elements to those of FIG. 7 are indicated with like reference characters, with the addition of the suffix "a." Parser application 86a comprises an assessment engine 102a and a visual identifier database 106a. Parser application 86a also comprises an application register 118. Application register 118 comprises fields 122, each field 122 containing an indication of an application maintained on client machine 54. For example, "Doc. view." 88 is contained in one such field 122, as document viewer application 88 is maintained on client machine 54. Applications which are not maintained on client machine 54 (i.e. which have not been installed on client machine 54) may be absent from register 118. In other embodiments (not shown), register 118 may contain fields corresponding to each of fields 122 and containing indications of whether an application indicated in each field 122 is maintained on client machine 54.

Assessment engine 102a may be configured to query both application register 118 and visual identifier database 106a. If an application initiated by interactive element 92 is not found in application register 118, assessment engine 102a may be configured to populate web page 90 according to a field 112 of visual identifier database 106a. Field 112 contains an indication that the application initiated by interactive element 92 is not maintained on client machine 54 or is otherwise unavailable. Field 116 of visual identifier database 106a corresponds to field 112, and contains therein icon 236. Assessment engine 102a may, therefore, populate web page 90 with icon 236 if interactive element 92 initiates an application which is unavailable on client machine 54. In this manner computational resources may be conserved, as web page 90' generated on display 224 will comprise a visual identifier that interactive element 92 initiates execution of an unavailable application, and that activation of interactive element 92 is therefore futile.

Figure 10:
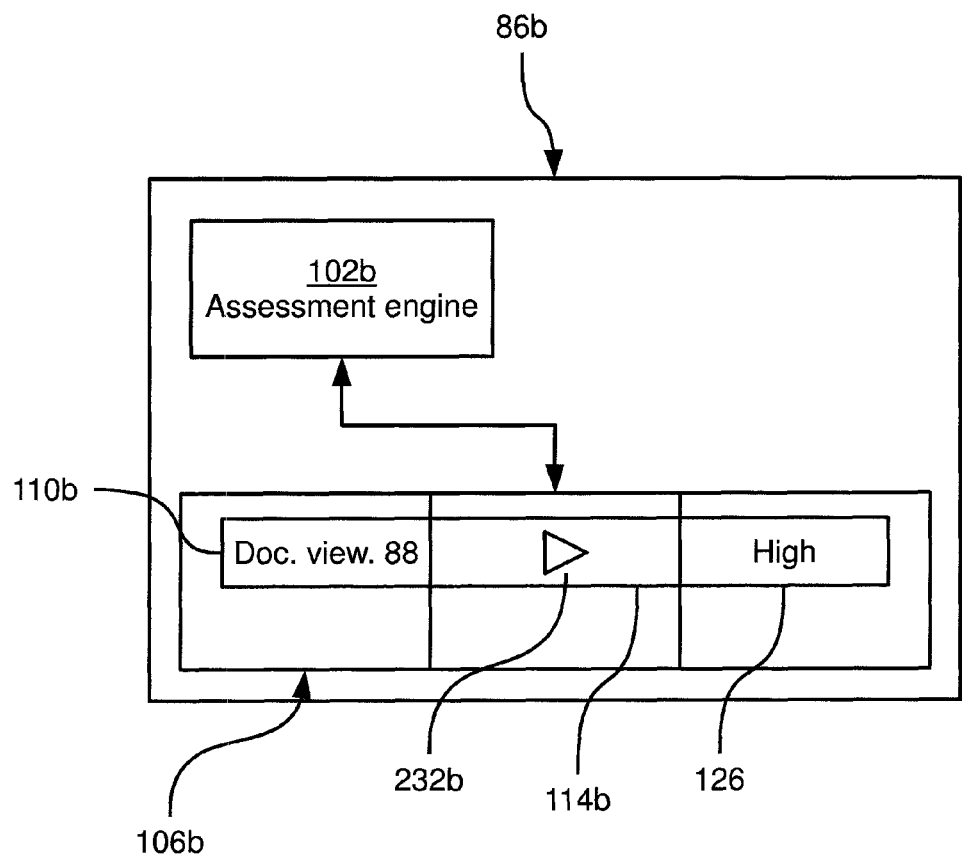
FIG. 10 shows a schematic view of a still further embodiment of a parser application.

A further embodiment of parser application 86 is depicted in FIG. 10, in which like elements to those of FIG. 7 are indicated by like reference characters followed by the suffix "b." Visual identifier 106b of parser application 86b comprises an additional field 126 corresponding to fields 110b and 114b. Field 126 contains an indication of a level of resource consumption on client machine 54 associated with execution of the application indicated in field 110b. For example, the usage level of processor 208 associated with the execution of document viewer application 88 may be high, and thus field 126 contains the indication "High." Assessment engine 102b may be configured to make use of field 126 by color-coding icon 232b in web page 90'. For instance, icon 232b may be colored (not shown) red for "High" usage levels, and other colors for other usage levels.

In other embodiments, the resources of client machine 54 may be effectively disposed by carrying out blocks 415-425 of method 400 before any rendering of web page 90 on display 224. In other words, rendering of web page 90 may be delayed as necessary until method 400 has been completed, instead of rendering web page 90 in an un-populated state and then re-rendering upon completion of block 425.

In still other embodiments, web server 62 may instead be a schema server hosting schema for web pages hosted by web servers. Client machine 54 may, for example, download a web page from web server 58 as well as a schema from the schema server. The downloaded schema may contain indications of the interactive elements within the web page as well as the applications initiated by those interactive elements. Parser application 86 may make use of the schema in populating the web page with visual identifiers.

Those skilled in the art will understand that subsets, combinations and variations of the foregoing are contemplated. The scope of the monopoly sought is defined by the claims attached hereto.

The invention claimed is:

1. A portable computing device comprising:
a storage device configured to maintain a first web-browser application;
at least one processor connected to said storage device and configured to execute said first web-browser application;
an interface connected to said processor;
said processor configured to receive a web page for display by said first web browser application from a server via said interface;
said received web page including at least one interactive element, wherein said at least one interactive element is retrieved as part of the process of receiving the web page and initiates execution of a second application associated with said at least one interactive element;
said processor configured to assess at least one of protocol specifications, file extensions, or header content types of said web page to detect said at least one interactive element;
said processor further configured to retrieve, based on an indication of said second application, at least one visual identifier from a visual identifier database maintained at said storage device and to populate a local copy of said web page with said at least one visual identifier for identifying said second application associated with said interactive element; and
said processor being further configured, prior to said populating said web page, to determine whether said second application is maintained at said storage device; and
said processor being further configured, if said second application is not maintained at said storage device, to populate said web page with a visual indication that said second application is not maintained at said storage device; and
a display connected to said processor;
said processor further configured to generate said web page with said at least one visual identifier on said display.

2. The portable computing device of claim 1, said processor being further configured to delay an initial generation of said web page on said display until said assessment and said population are completed.

3. The portable computing device of claim 1, said processor being further configured, prior to populating a copy of said web page maintained at said storage device, to retrieve, based on said indication of said second application, an indication of resource usage associated with execution of said second application at said portable computing device from said visual identifier database.

4. A system for managing interactive content, the system comprising:
   a server configured to maintain a web page for generation using a first web-browser application;
   said maintained web page including at least one interactive element, wherein said at least one interactive element initiates execution of a second application associated with said at least one interactive element;
   said server having an interface to connect said server to a network; and
   a portable computing device having a storage device configured to maintain a web-browser application;
   said portable computing device having at least one processor connected to said storage device and configured to execute said first web-browser application;
   said portable computing device having an interface for interconnecting said processor and said network; said processor configured to receive said web page for display by said first web-browser application from said server via said interface, wherein said at least one interactive element is retrieved as part of the process of receiving the web page;
   said processor configured to assess at least one of protocol specifications, file extensions, or header content types of said web page to detect said at least one interactive element;
   said processor further configured to retrieve, based on an indication of said second application, at least one visual identifier from a visual identifier database maintained at said storage device and to populate a local copy of said web page with said at least one visual identifier for identifying said second application associated with said interactive element;
   said processor further configured to retrieve to determine, prior to said populating, whether said second application is maintained at said storage device for execution by said portable computing device; and
   said processor further configured to populate, if said second application is not maintained at said storage device, said web page with a visual indication that said second application is not maintained at said storage device; and
   said portable computing device further comprising a display connected to said processor;
   said processor further configured to generate said web page with said at least one visual identifier on said display.

5. A method of managing interactive content on a portable computing device having a storage device, a display and an interface, the method comprising:
   receiving a web page for display by a first web-browser application from a server via said interface, said received web page including at least one interactive element, wherein said at least one interactive element is retrieved as part of a process of receiving the web page and initiates execution of a second application associated with said at least one interactive element;
   assessing at least one of protocol specifications, file extensions, or header content types of said web page to detect said at least one interactive element;
   retrieving, based on an indication of said second application, at least one visual identifier from a visual identifier database maintained at said storage device;
   populating a local copy of said web page with said at least one visual identifier maintained at said storage device for identifying said second application associated with said interactive element; and
   determining, prior to said populating, whether said second application is maintained at said storage device for execution by said portable computing device and;
   populating, if said second application is not maintained at said storage device, said web page with a visual indication that said second application is not maintained at said storage device and;
   generating said web page with said at least one visual identifier on said display.

6. The method of claim 5, further comprising:
   delaying an initial generation of said web page on said display until said assessing and said populating are completed.

7. The method of claim 5, further comprising:
   retrieving, based on said indication of said second application, an indication of resource usage associated with execution of said second application at said portable computing device from said visual identifier database; and
   populating said copy of said web page with said indication of resource usage.

8. A computer readable storage medium configured to maintain a plurality of programming instructions for a processor of a portable computing device; said processor configured to execute said programming instructions; said programming instructions comprising the method of:
   receiving a web page for display by a first web-browser application from a server via an interface of said portable computing device, said received web page including at least one interactive element, wherein said at least one interactive element is retrieved as part of a process of receiving the web page and initiates execution of a second application associated with said at least one interactive element;
   assessing at least one of protocol specifications, file extensions, or header content types of said web page to detect said at least one interactive element;
   retrieving, based on an indication of said second application, at least one visual identifier from a visual identifier database maintained at said storage device;
   populating a local copy of said web page with said at least one visual identifier maintained at a storage device of said portable computing device for identifying said second application associated with said interactive element; and
   determining, prior to said populating, whether said second application is maintained at said storage device and;
   populating, if said second application is not maintained at said storage device, said web page with a visual indication that said second application is not maintained at said storage electronic device and;
   generating said web page with said at least one visual identifier on a display of said portable computing device.

9. The computer readable storage medium of claim 8, said programming instructions further comprising:
   delaying an initial generation of said web page on said display until said assessing and said populating are completed.

10. The computer readable storage medium of claim 8, said programming instructions further comprising:
    retrieving, based on said indication of said second application, an indication of resource usage associated with execution of said second application at said portable computing device from said visual identifier database; and populating said copy of said web page with said indication of resource usage.

* * * * *